US012766829B2

(12) United States Patent
Harada

(10) Patent No.: US 12,766,829 B2
(45) Date of Patent: Oct. 20, 2026

(54) LIQUID EJECTION HEAD AND LIQUID EJECTION APPARATUS

(71) Applicant: RISO Technologies Corporation, Tokyo (JP)

(72) Inventor: Sota Harada, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 47 days.

(21) Appl. No.: 18/970,838

(22) Filed: Dec. 5, 2024

(65) Prior Publication Data

US 2025/0289223 A1 Sep. 18, 2025

(30) Foreign Application Priority Data

Mar. 18, 2024 (JP) ................................ 2024-042629

(51) Int. Cl.
*B41J 2/045* (2006.01)

(52) U.S. Cl.
CPC ....... *B41J 2/04573* (2013.01); *B41J 2/04525* (2013.01); *B41J 2/04581* (2013.01); *B41J 2/04588* (2013.01); *B41J 2202/10* (2013.01)

(58) Field of Classification Search
CPC . B41J 2/04573; B41J 2/04525; B41J 2/04588
See application file for complete search history.

(56) References Cited

U.S. PATENT DOCUMENTS

2018/0147836 A1 5/2018 Klerken
2020/0070506 A1 3/2020 Nitta et al.
2021/0276325 A1 9/2021 Nitta

FOREIGN PATENT DOCUMENTS

JP 2020-032580 A 3/2020

OTHER PUBLICATIONS

Extended European Search Report mailed Aug. 26, 2025, in corresponding European Patent Application No. 25158970.1, 6 pages.

*Primary Examiner* — Julian D Huffman
(74) *Attorney, Agent, or Firm* — Kim & Stewart LLP

(57) ABSTRACT

A liquid ejection head includes nozzles arranged in a first direction, pressure chambers respectively communicating with the nozzles, a volume of each chamber being varied to eject liquid through the nozzle, an actuator varying the volumes according to drive waveforms applied to the chambers, and a drive circuit generating a drive waveform for each chamber with a delay time to cause the liquid to be ejected with the delay time. The drive circuit determines the delay time to be a sum of: a first delay time for the particular chamber, the first delay time for all the chambers varying so as to have a triangular wave shape with respect to positions of the chambers, and a second delay time for the particular chamber, the second delay time for all the chambers varying so as to have a periodic wave shape with respect to the positions of the chambers.

20 Claims, 8 Drawing Sheets

FIG. 7

| NOZZLE NUMBER | DELAY AMOUNT (μs) | MAIN DELAY AMOUNT (μs) | SUB DELAY AMOUNT (μs) | DIFFERENCE (μs) IN DELAY TIME BETWEEN ADJACENT NOZZLES | DIFFERENCE (μs) IN SUB DELAY TIME BETWEEN ADJACENT NOZZLES |
|---|---|---|---|---|---|
| 1 | 2.2 | 2 | 2.0 | 2.2 | 0.2 |
| 2 | 0 | 0 | 0 | 2 | |
| 3 | 2 | 2 | 0 | 1.9 | -0.1 |
| 4 | 0.1 | 0 | 0.1 | 2 | |
| 5 | 2.1 | 2 | 0.1 | 1.8 | -0.2 |
| 6 | 0.3 | 0 | 0.3 | 2 | |
| 7 | 2.3 | 2 | 0.3 | 2.1 | 0.1 |
| 8 | 0.2 | 0 | 0.2 | 2 | |
| 9 | 2.2 | 2 | 0.2 | 2.2 | 0.2 |
| 10 | 0 | 0 | 0 | 2 | |
| 11 | 2 | 2 | 0 | 1.9 | -0.1 |
| 12 | 0.1 | 0 | 0.1 | 2 | |
| 13 | 2.1 | 2 | 0.1 | 1.8 | -0.2 |
| 14 | 0.3 | 0 | 0.3 | 2 | |
| 15 | 2.3 | 2 | 0.3 | 2.1 | 0.1 |
| 16 | 0.2 | 0 | 0.2 | 2 | |

LIQUID EJECTION HEAD AND LIQUID EJECTION APPARATUS

CROSS-REFERENCE TO RELATED APPLICATION

This application is based upon and claims the benefit of priority from Japanese Patent Application No. 2024-042629, filed on Mar. 18, 2024, the entire contents of which are incorporated herein by reference.

FIELD

Embodiments described herein relate generally to a liquid ejection head and a liquid ejection apparatus.

BACKGROUND

In a method for driving a piezoelectric inkjet head in related art, a technique is known to group a plurality of nozzles and shift a drive timing with different delay times for each group. According to this method for driving an inkjet head, current concentration during simultaneous driving can be avoided, and structural or fluid mutual interference between nozzles, that is, crosstalk can be reduced. In the technique, the delay time corresponds to a sum of a main delay time and a sub delay time. However, when the technique is applied to an inkjet head having a one-dimensional nozzle arrangement, density unevenness is likely to occur at discontinuous portions because the sub delay time is in a sawtooth wave shape that is discontinuous with respect to the arrangement direction of nozzles.

BRIEF DESCRIPTION OF THE DRAWINGS

FIG. 7 is a diagram illustrating an example of the main delay time, the sub delay time, and a difference in delay time.

DETAILED DESCRIPTION

According to the present disclosure, a liquid ejection head and a liquid ejection apparatus that can prevent a difference in drive time between adjacent nozzles and can prevent an occurrence of density unevenness can be provided.

A liquid ejection head comprises a nozzle plate having a plurality of nozzles arranged in a first direction; a plurality of pressure chambers that respectively communicate with the nozzles, a volume of each of the pressure chambers being varied to eject liquid through the corresponding nozzle; an actuator configured to vary the volumes of the pressure chambers independently according to drive waveforms respectively applied to the pressure chambers; and a drive circuit configured to generate a drive waveform for each of the pressure chambers with a delay time to cause the liquid to be ejected through the corresponding nozzle with the delay time. The drive circuit is configured to determine the delay time for a drive waveform for a particular pressure chamber to be a sum of: a first delay time for the particular pressure chamber, the first delay time for all the pressure chambers varying so as to have a triangular wave shape with respect to positions of the pressure chambers in the first direction, and a second delay time for the particular pressure chamber, the second delay time for all the pressure chambers varying so as to have a periodic wave shape with respect to the positions of the pressure chambers in the first direction. A periodicity of the wave shape of the second delay time is different from a periodicity of the wave shape of the first delay time.

Figure 1:
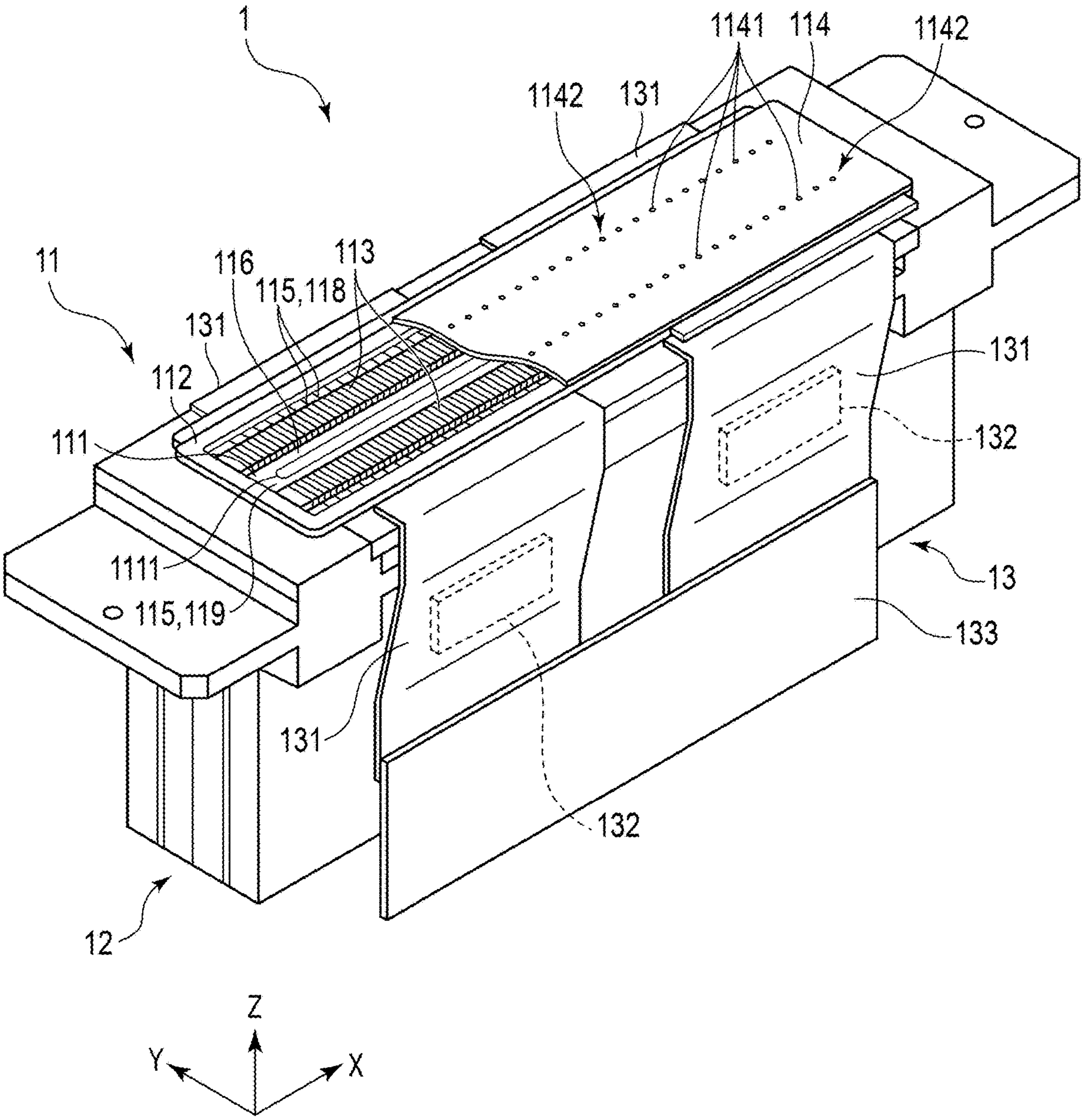
FIG. 1 is a perspective view illustrating a configuration of a liquid ejection head according to an embodiment.
Figure 2:
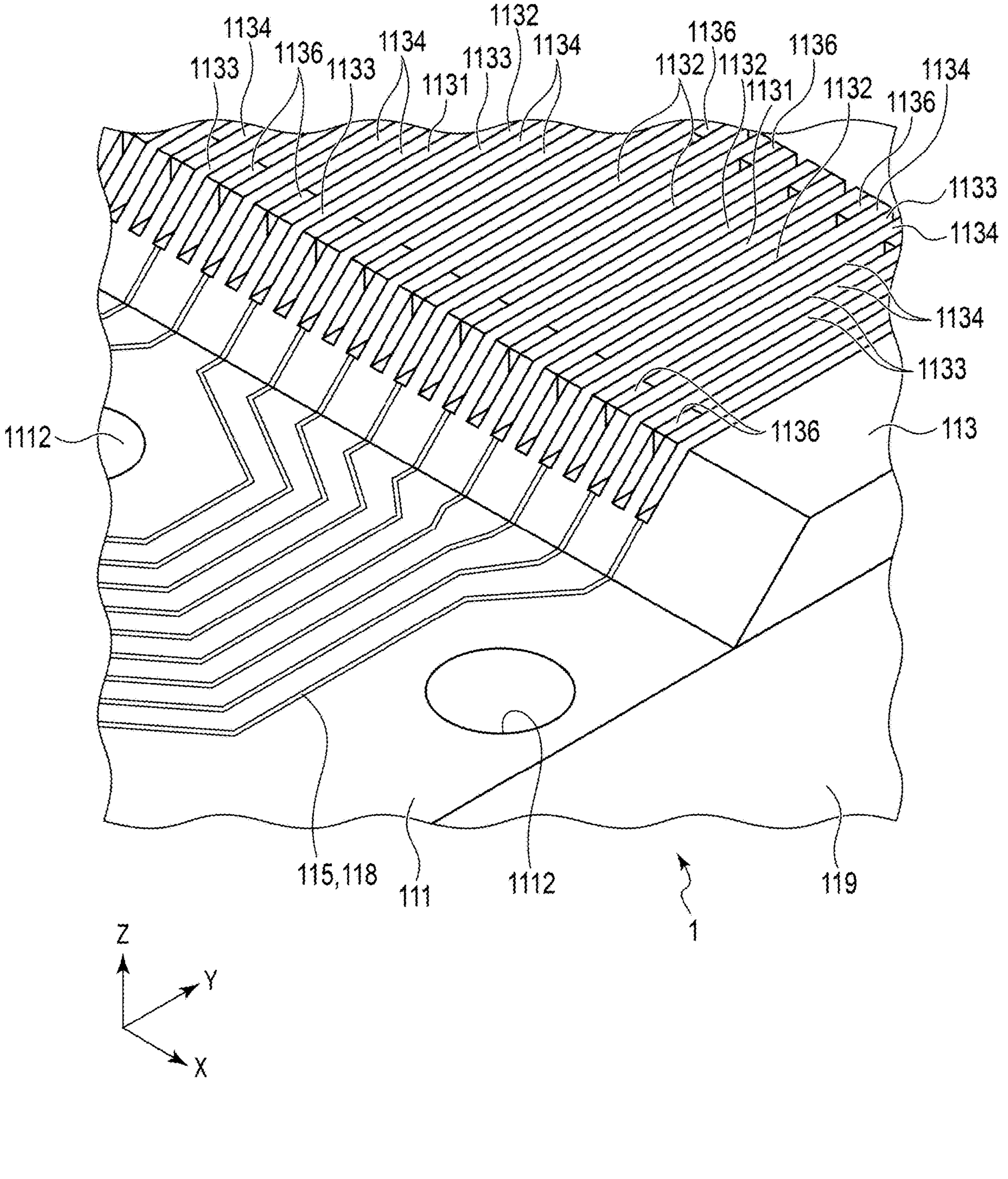
FIG. 2 is a perspective view illustrating a head main body of the liquid ejection head.
Figure 3:
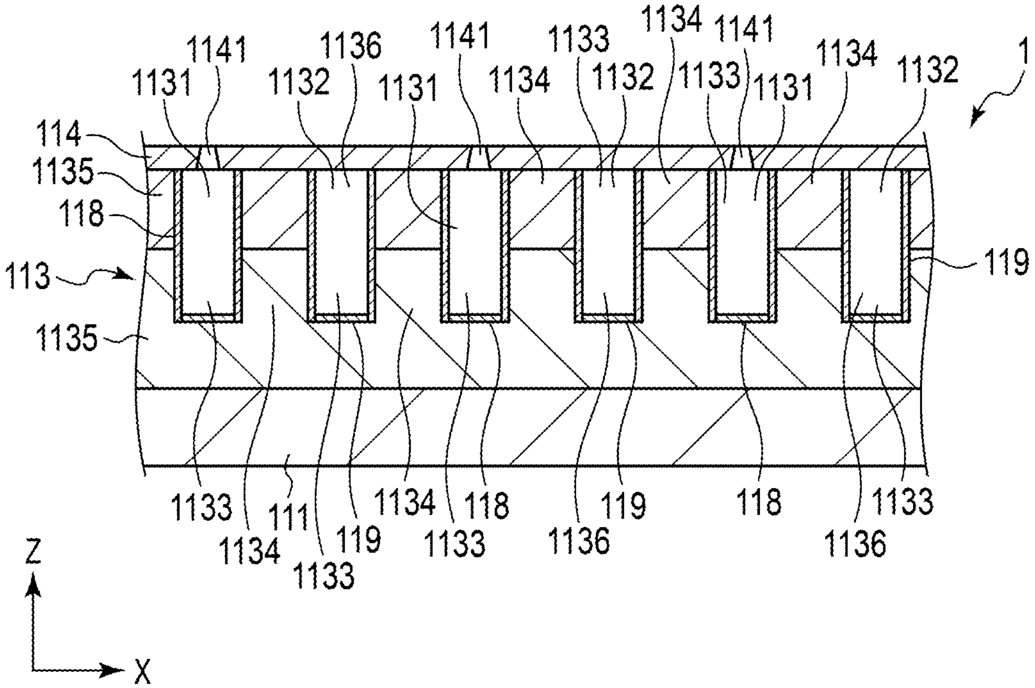
FIG. 3 is a cross-sectional view illustrating the head main body.
Figure 4:
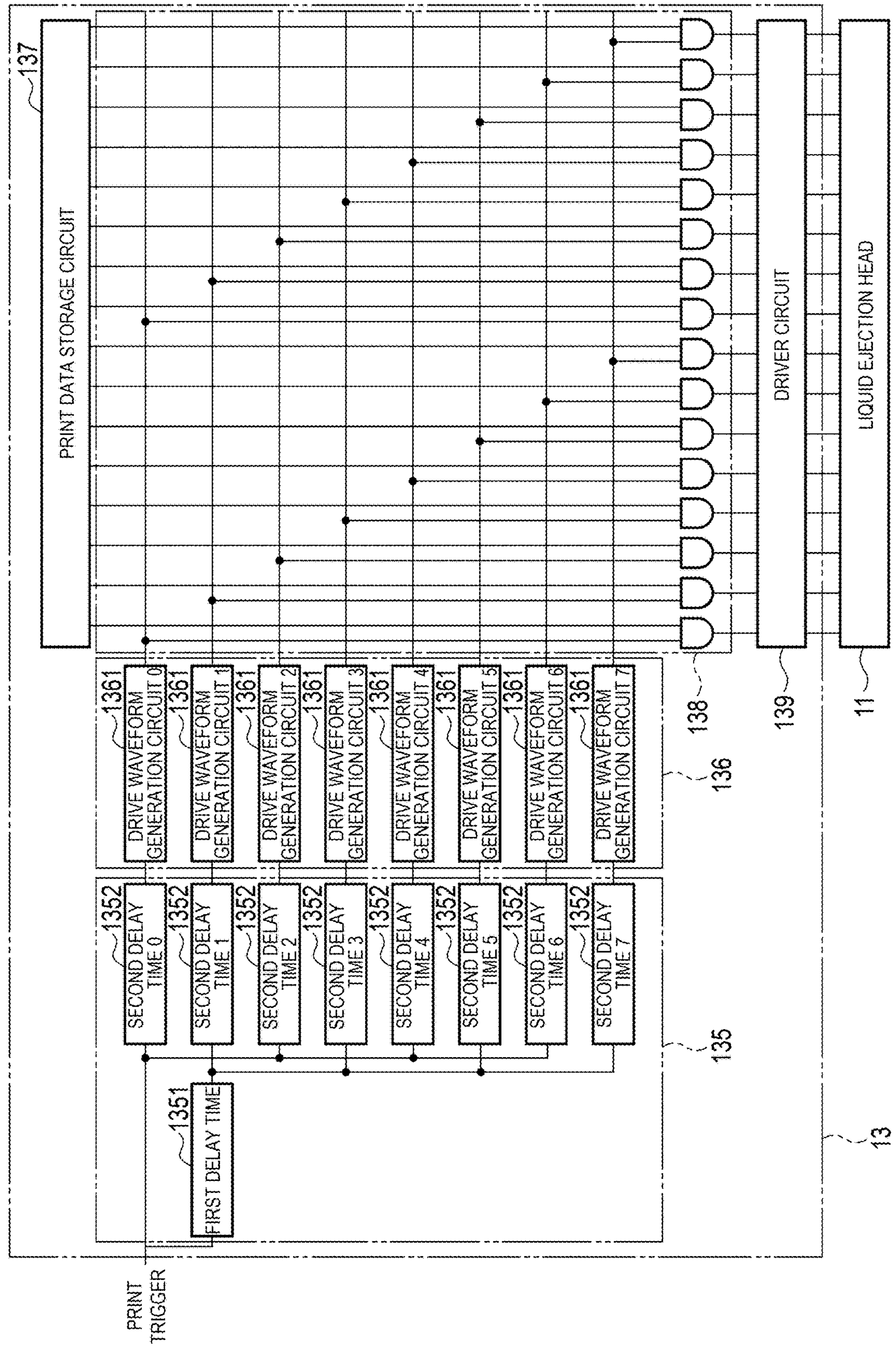
FIG. 4 is a block diagram illustrating a circuit board of the liquid ejection head.
Figure 5:
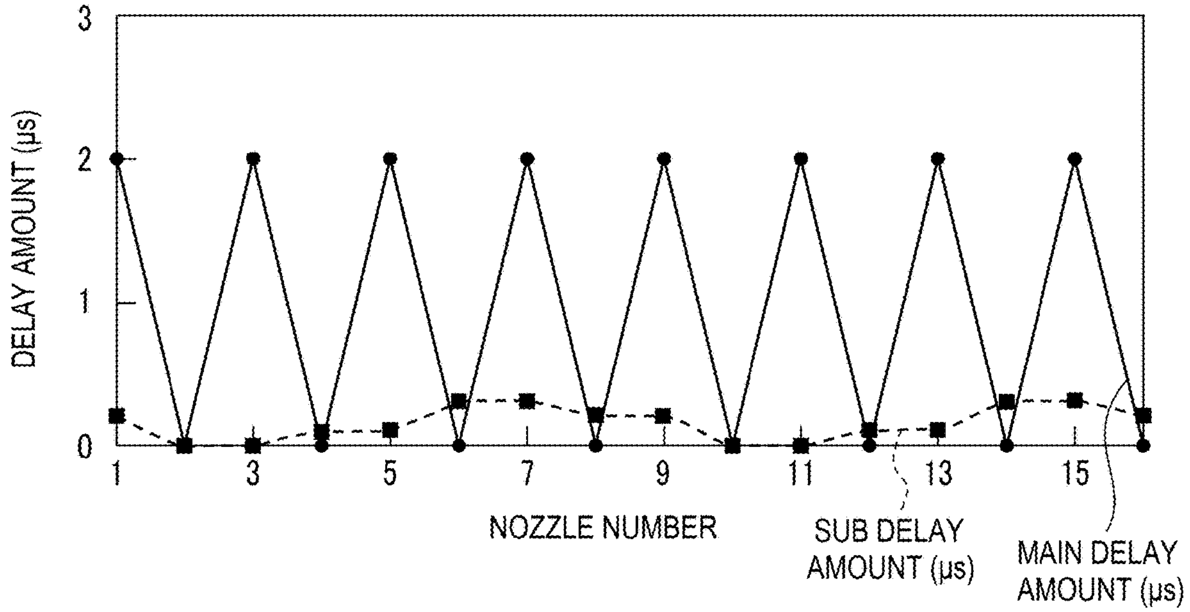
FIG. 5 is a diagram illustrating an example of a main delay time and a sub delay time.
Figure 6:
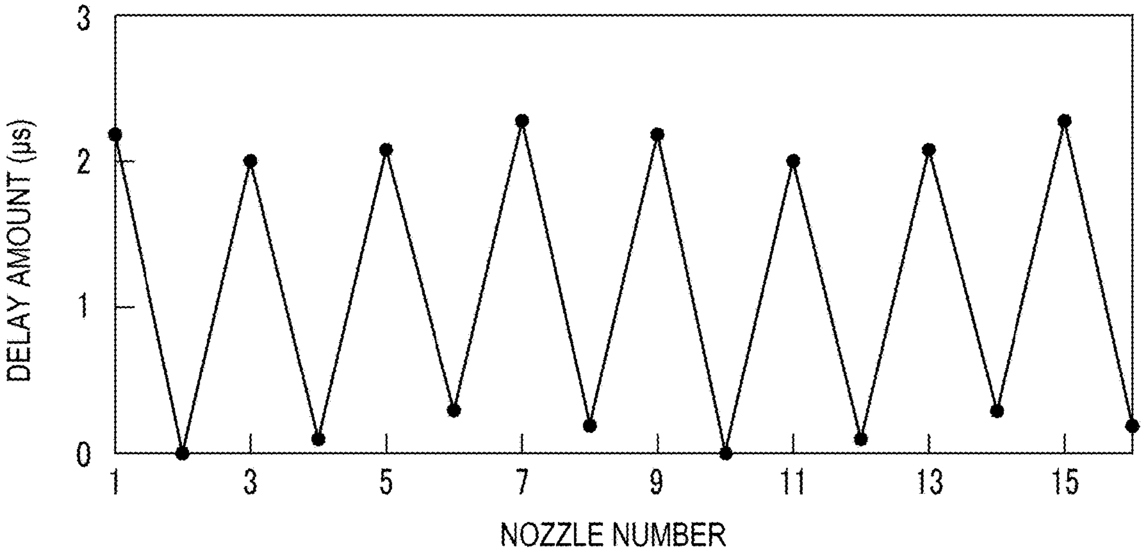
FIG. 6 is a diagram illustrating an example of a delay amount using the main delay time and the sub delay time.
Figure 8:
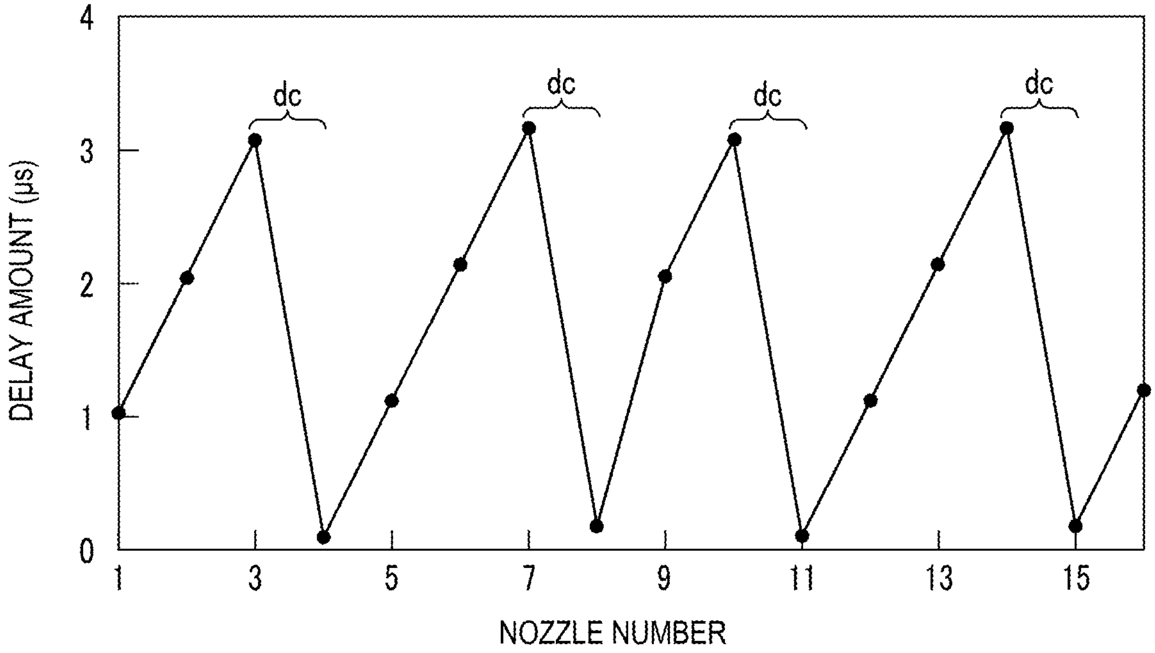
FIG. 8 is a diagram illustrating an example of a delay amount using a main delay time and a sub delay time of a liquid ejection head in related art.
Figure 9:
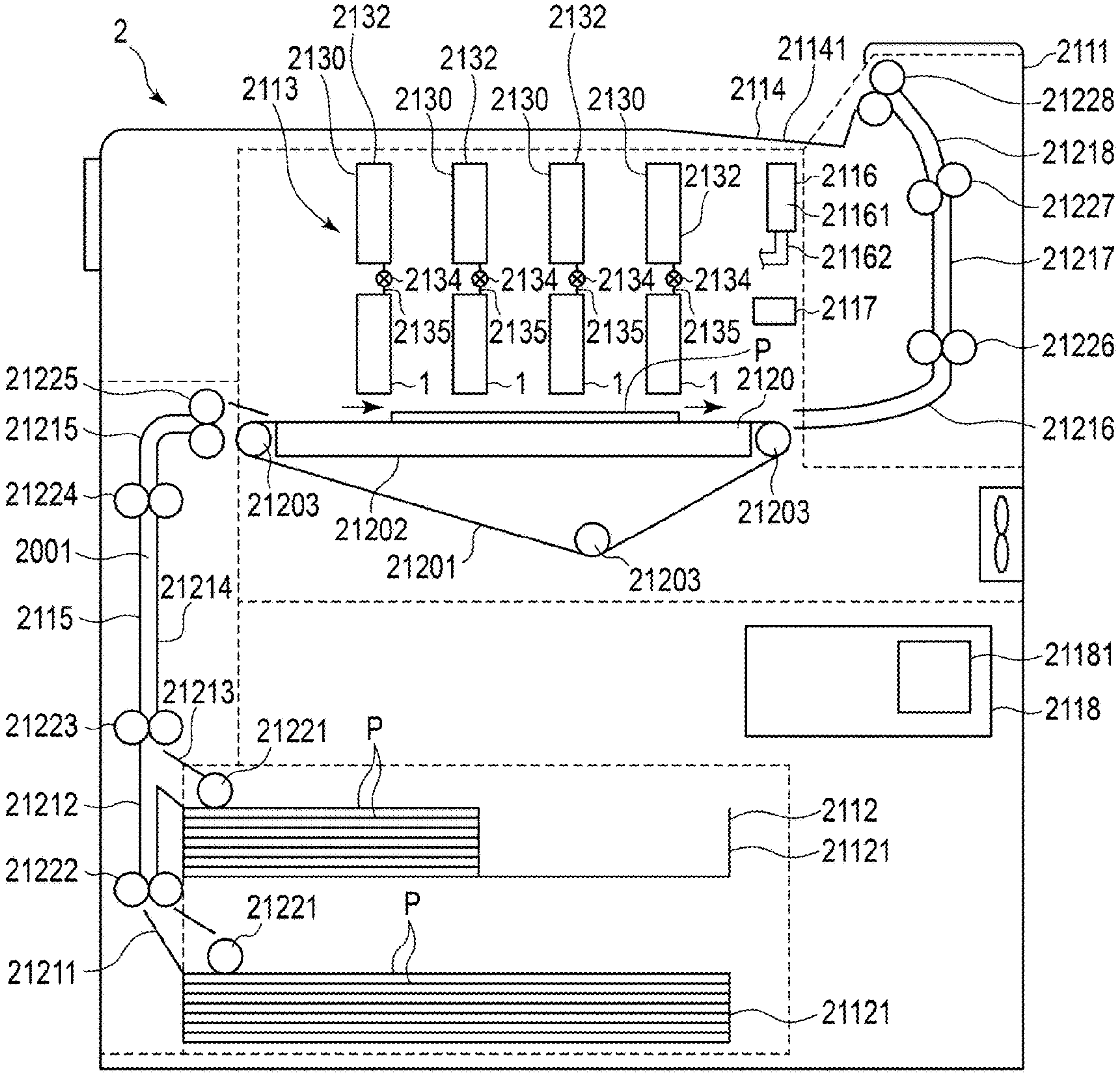
FIG. 9 is a diagram schematically illustrating a configuration of a liquid ejection apparatus.

A liquid ejection head 1 and a liquid ejection apparatus 2 including the liquid ejection head 1 according to an embodiment will be described below with reference to FIGS. 1 to 9. FIG. 1 is a perspective view illustrating a configuration of the liquid ejection head 1. FIG. 2 is a perspective view illustrating a head main body 11 of the liquid ejection head 1. FIG. 3 is a cross-sectional view illustrating the head main body 11. FIG. 4 is a block diagram illustrating a configuration of a circuit board 13 of the liquid ejection head 1. FIG. 5 is a diagram illustrating an example of a main delay time and a sub delay time. FIG. 6 is a diagram illustrating an example of a delay amount using the main delay time and the sub delay time. FIG. 7 is a diagram illustrating an example of the main delay time, the sub delay time, and a difference between the delay times. FIG. 8 is a diagram illustrating an example of a delay amount using a main delay time and a sub delay time of a liquid ejection head according to a Comparative Example. FIG. 9 is a diagram schematically illustrating a configuration of the liquid ejection apparatus 2 including the liquid ejection head 1. In the drawings, a configuration is illustrated enlarged, reduced, or omitted as appropriate for the purpose of description. In FIGS. 1 to 3, three directions orthogonal to one another are indicated by X, Y, and Z.

The liquid ejection head 1 is, for example, a share-mode inkjet head that ejects ink as a liquid onto a recording or printing medium such as a paper sheet. The liquid ejection head 1 is provided in the liquid ejection apparatus 2 such as an inkjet recording apparatus illustrated in FIG. 9. The liquid ejection head 1 is provided in a head unit 2130 including a supply tank 2132 as a liquid container provided in the liquid ejection apparatus 2.

The liquid ejection head 1 is supplied with ink as a liquid stored in the supply tank 2132. The liquid ejection head 1 may be a non-circulation type head that does not circulate ink, or may be a circulation type head that circulates ink. The liquid ejection head 1 is connected to a temperature control device 2116 provided in the liquid ejection apparatus 2, and is supplied with a temperature control liquid (e.g., temperature control water) for controlling a temperature of ink.

As illustrated in FIG. 1, the liquid ejection head 1 includes the head main body 11, a manifold unit 12, and the circuit board 13. For example, the liquid ejection head 1 is a side shooter type four-row integral structure head including a pair of head main bodies 11 each including a pair of actuators 113.

The head main body 11 ejects liquid. As illustrated in FIGS. 1 to 3, the head main body 11 includes a board 111, a frame member 112, the actuators 113 each including a plurality of pressure chambers 1131 and a plurality of air chambers 1132, a nozzle plate 114, and electrodes 115 formed on the board 111 and the actuator 113. The head main body 11 has a common liquid chamber 116 formed by the board 111, the frame member 112, and the nozzle plate 114, and the actuators 113 are disposed in the common liquid chamber 116, whereby the plurality of pressure chambers 1131 and the common liquid chamber 116 are fluidly communicated.

Here, an example will be described in which the head main body 11 includes the pair of actuators 113, and the common liquid chamber 116 communicates with both ends of the plurality of pressure chambers 1131 formed in each of the pair of actuators 113.

The board 111 is formed in a rectangular plate shape from, for example, a ceramic material. The board 111 is formed in a rectangular shape elongated in one direction, for example. A wiring pattern for forming part of the electrodes 115 is formed on one surface of the board 111. As a specific example, a wiring pattern to be part of a plurality of individual electrodes 118 (described later) among the electrodes 115 and a wiring pattern to be part of a single common electrode 119 are formed on one surface of the board 111. The pair of actuators 113 are provided on one surface of the board 111 and aligned in a transverse direction of the board 111. The one surface of the board 111 refers to one of main surfaces of the board 111. The board 111 includes, for example, a single or a plurality of supply ports 1111 and a plurality of discharge ports 1112. The supply port 1111 and the discharge port 1112 are through holes formed in the board 111 and penetrating between both main surfaces of the board 111.

The supply port 1111 is an inlet for supplying ink to the common liquid chamber 116. The supply port 1111 is a through hole formed in a center of the board 111 in the transverse direction. The supply port 1111 extends along a longitudinal direction of the board 111. In other words, the supply port 1111 is, for example, an elongated hole that is long in one direction along a longitudinal direction of the actuator 113 and a longitudinal direction of the common liquid chamber 116. The supply port 1111 is provided between the pair of actuators 113 and opens at a position facing the common liquid chamber 116.

The discharge port 1112 is an outlet for discharging ink from the common liquid chamber 116. The plurality of discharge ports 1112 are provided. The discharge ports 1112 are provided in the common liquid chamber 116.

The frame member 112 is fixed to one main surface of the board 111 by an adhesive or the like. The frame member 112 surrounds the supply port 1111, the plurality of discharge ports 1112, and the actuators 113 provided on the board 111. For example, the frame member 112 has a stepped structure.

For example, the frame member 112 is formed in a rectangular frame shape, and thus an opening that is long in one direction along a longitudinal direction of the frame member 112 is formed. The pair of actuators 113, the supply port 1111, and four discharge ports 1112 are disposed in the opening of the frame member 112. When the liquid ejection head 1 is of a circulation type, the discharge port 1112 as illustrated in FIG. 2 is provided. When the liquid ejection head 1 is of a non-circulation type, the discharge port 1112 as illustrated in FIG. 2 is not provided.

The pair of actuators 113 are bonded to a mounting surface of the board 111. The pair of actuators 113 are provided on the board 111 in two rows with the supply port 1111 sandwiched therebetween. The actuators 113 are formed in a plate shape elongated in one direction. The actuators 113 are disposed in the opening of the frame member 112 and bonded to the main surface of the board 111.

As illustrated in FIGS. 1 to 3, the actuator 113 includes the plurality of pressure chambers 1131 disposed at equal intervals in the longitudinal direction, and the plurality of air chambers 1132 each of which disposed between the adjacent pressure chambers 1131 when disposed at equal intervals in the longitudinal direction. In other words, in the actuator 113, the plurality of pressure chambers 1131, and the plurality of air chambers 1132 are alternately disposed along the longitudinal direction.

A surface of the actuator 113 opposite to the board 111 is bonded to the nozzle plate 114. On the actuator 113, a plurality of grooves 1133 are formed, which are disposed at equal intervals in the longitudinal direction and extend in a direction perpendicular to the longitudinal direction. The plurality of grooves 1133 form the plurality of pressure chambers 1131 and the plurality of air chambers 1132. That is, the plurality of grooves 1133 include a plurality of pressure grooves constituting the plurality of pressure chambers 1131 and a plurality of air grooves constituting the plurality of air chambers 1132. In other words, the actuator 113 includes a plurality of piezoelectric bodies 1134 disposed at equal intervals in the longitudinal direction and serving as drive elements that constitute walls defining the grooves 1133 therebetween. The plurality of piezoelectric bodies 1134 form the plurality of pressure chambers 1131 and the plurality of air chambers 1132 between adjacent piezoelectric bodies 1134, and vary volumes of the pressure chambers 1131 by applying a drive voltage.

For example, a width of the actuator 113 in the transverse direction gradually increases from a top side fixed to the nozzle plate 114 toward the board 111 side. A cross-sectional shape of a cross section of the actuator 113 along a direction (i.e., a transverse direction) perpendicular to the longitudinal direction is formed to be trapezoidal. That is, a side surface of the actuator 113 in the transverse direction is an inclined surface that is inclined at a predetermined angle.

For example, as illustrated in FIG. 3, the actuator 113 is formed of a stacked piezoelectric member in which two piezoelectric materials 1135 each having a rectangular plate shape elongated in one direction are bonded to each other such that polarization directions thereof are opposite to each other. Here, the piezoelectric material 1135 is, for example, lead zirconate titanate (PZT). The actuator 113 is bonded to the mounting surface of the board 111 by, for example, a thermosetting epoxy-based adhesive. The actuator 113 has an inclined surface formed by, for example, cutting. Additionally, surfaces of the board 111 and the actuators 113 on which the plurality of individual electrodes 118 and the common electrode 119 among the electrodes 115 are patterned are polished, for example, by polishing to form a polished surface. For example, the polished surface is formed on the inclined surfaces of the actuators 113 and the board 111 at a base of the inclined surfaces. In the actuator 113, the plurality of grooves 1133 forming the plurality of pressure chambers 1131 and the plurality of air chambers 1132 are formed, for example, by cutting, and the piezoelectric bodies (i.e., the drive elements) 1134, which are side walls partitioning between the adjacent grooves 1133, are formed.

In the actuator 113, the wiring pattern to be part of the plurality of individual electrodes 118 and the wiring pattern to be part of the single or the plurality of common electrodes 119 are formed.

The pressure chamber 1131 deforms when the liquid ejection head 1 performs an operation such as printing, thereby ejecting ink from nozzles 1141. The pressure chamber 1131 is formed such that each of openings of the actuator 113 in the transverse direction opens to the common liquid chamber 116 and ink can flow into and out of the pressure chamber 1131.

The air chamber 1132 is separated from the common liquid chamber 116 by closing both sides of the air groove formed in the actuator 113 in the longitudinal direction by a liquid prevention wall 1136 which is a resin wall formed of a photosensitive resin or the like. For example, the liquid prevention wall 1136 of the air chamber 1132 is formed by injecting an ultraviolet curable resin into a groove forming the air chamber 1132, and then irradiating a necessary portion, for example, both end portions of the groove 1133 adjacent to the common liquid chamber 116 with ultraviolet rays using a mask plate or the like. Such a liquid prevention wall 1136 prevents ink from entering the air chamber 1132. The liquid prevention wall 1136 is formed on the common electrode 119 formed in the air chamber 1132 of the actuator 113. The air chamber 1132 is closed by the nozzle plate 114 and no nozzle 1141 is disposed therein. Therefore, no ink flows into the air chamber 1132.

The nozzle plate 114 is formed in a plate shape. The nozzle plate 114 is fixed to the main surface of the frame member 112 opposite to the board 111 by an adhesive or the like. The nozzle plate 114 includes a plurality of nozzles 1141 formed at positions facing the plurality of pressure chambers 1131. In the present example, the nozzle plate 114 has two nozzle rows 1142 in which the plurality of nozzles 1141 are aligned in one direction. That is, the liquid ejection head 1 has a one-dimensional nozzle arrangement in which the plurality of pressure chambers 1131 and the plurality of nozzles 1141 corresponding to the plurality of pressure chambers 1131 are aligned in one direction for one actuator 113.

The electrode 115 is an electrode film (e.g., a metal film) formed in a film shape from a metal material. As illustrated in FIGS. 2 and 3, the electrode 115 includes, for example, a plurality of individual electrodes 118 connected to the plurality of pressure chambers 1131, respectively, and a single or a plurality of common electrodes 119 connected to all or some of the plurality of air chambers 1132.

The electrodes 115 are formed on an upper surface of the board 111 and the inclined surface of the actuator 113, and are also formed on bottom surfaces and side surfaces of the plurality of pressure chambers 1131 and the plurality of air chambers 1132.

The plurality of individual electrodes 118 apply drive voltages individually to the electrodes 115 formed on inner surfaces of the plurality of pressure chambers 1131. When the drive voltages are applied, voltages are generated between the common electrodes 119 formed on inner surfaces of the adjacent air chambers 1132, and the piezoelectric bodies 1134 are deformed. That is, the plurality of individual electrodes 118 individually deform the respective pressure chambers 1131. As illustrated in FIGS. 2 and 3, the individual electrodes 118 are formed with a wiring pattern formed on the board 111, a wiring pattern formed on the inclined surface of the actuator 113, and a wiring pattern formed on the bottom surfaces and the side surfaces as the inner surfaces of the pressure chambers 1131. The plurality of individual electrodes 118 are connected to the circuit board 13.

The common electrodes 119 are electrically connected to the electrodes 115 formed on the inner surfaces of the air chambers 1132. As illustrated in FIGS. 2 and 3, the common electrodes 119 are formed with a wiring pattern formed on the board 111 and a wiring pattern formed on the actuator 113. The common electrodes 119 are wiring patterns formed in a predetermined area on the board 111 that avoids an area where the plurality of individual electrodes 118 are formed, on the inclined surface of the actuator 113 opposite to the inclined surface where the plurality of individual electrodes 118 are formed, and across the bottom surfaces and the side surfaces of the plurality of air chambers 1132. Further, the common electrodes 119 may also be formed on a surface of the board 111 opposite to the surface on which the actuator 113 is provided and on an inner peripheral surface of the supply port 1111 of the board 111. The common electrodes 119 are connected to the circuit board 13.

The manifold unit 12 includes a manifold, a top plate, an ink supply pipe, and an ink discharge pipe. By assembling each component integrally, the manifold unit 12 forms a flow path inside that supplies ink from a primary side to the common liquid chamber 116 via the supply port 1111, and discharges the ink from the common liquid chamber 116 to a secondary side via the discharge port 1112.

As illustrated in FIG. 1, the circuit board 13 includes a wiring film 131 having one end connected to a connecting portion of the board 111, a drive IC 132 mounted on the wiring film 131, and a printed wiring board 133 mounted on the other end of the wiring film 131.

For example, the circuit board 13 drives the actuator 113 by applying a drive voltage to a wiring pattern of the actuator 113 by a drive circuit formed in the drive IC 132 including a driver circuit 139 to which the plurality of individual electrodes 118 are electrically and independently connected, thereby increasing or decreasing the volumes of the pressure chambers 1131 and discharging liquid droplets from the nozzles 1141.

The wiring film 131 is connected to the plurality of individual electrodes 118 and the common electrodes 119. For example, the wiring film 131 is an anisotropic conductive film (ACF) that is fixed to the connecting portion of the board 111 by thermal compression or the like. For example, a plurality of wiring films 131 to be connected are provided for one head main body 11. In the present embodiment, two wiring films 131 are connected to one actuator 113. The wiring film 131 is, for example, a chip on film (COF) on which the drive IC 132 is mounted.

The drive IC 132 is connected to the plurality of individual electrodes 118 and the common electrodes 119 via the wiring film 131. The drive IC 132 may be connected to the plurality of individual electrodes 118 and the common electrodes 119 by other methods such as anisotropic conductive paste (ACP), a non-conductive film (NCF), and non-conductive paste (NCP), instead of the wiring film 131.

For example, as illustrated in FIG. 4, the drive IC 132 includes, as drive circuits, a delay time generation circuit 135 that generates a first delay time and a second delay time when driving the plurality of pressure chambers 1131 in a case where a print trigger is input, a drive waveform generation circuit 136 including a plurality of drive waveform generation circuits 1361 that generate drive waveforms for driving the respective pressure chambers 1131, a print data storage circuit 137 that stores print data, a waveform assignment circuit 138 that can set which of a plurality of types of drive waveforms is to be assigned to the pressure chamber 1131 corresponding to the nozzle 1141, and the driver circuit 139 which is a drive signal output circuit that outputs a drive signal for driving the plurality of pressure chambers 1131. The delay time generation circuit 135, the drive waveform generation circuit 136, the print data storage circuit 137, the waveform assignment circuit 138, and the driver circuit 139 may be provided in the circuit board 13, and may, for example, be formed in part in the drive IC 132 and in other parts in other components of the circuit board 13, such as the printed wiring board 133, or may all be formed in components of the circuit board 13 other than the drive IC 132.

For example, when receiving a print trigger signal, the drive IC 132 generates drive waveforms and changes voltages of the individual electrodes 118 on the actuator 113 to deform the piezoelectric bodies 1134 of the corresponding pressure chambers 1131. Accordingly, the volumes of the pressure chambers 1131 vary, ink inside the pressure chambers 1131 is pressurized, and the ink is ejected from the nozzles 1141.

The plurality of nozzles 1141 or the plurality of pressure chambers 1131 are grouped into a predetermined number of groups each including a certain number of nozzles 1141. The drive IC 132 outputs drive waveforms having different drive timings for each of the predetermined grouped nozzles 1141 in response to a print trigger to drive the pressure chambers 1131. For example, using an example in which the nozzles 1141 are grouped into eight groups, the drive IC 132 sets a drive timing (i.e., a delay amount) with eight different timings in an eight-nozzle period in response to the print trigger. The drive timing is determined based on a sum of a main delay time and a sub delay time having different number of nozzles that are periodic and delay times. The number of groups is not limited to eight, and may be an even or odd number as long as it is two or more.

Here, when grouping the plurality of nozzles 1141 into n groups, in a case where the nozzle 1141 at a predetermined position is taken as a first or reference nozzle, a nozzle number of the first nozzle 1141 is set to ni, a nozzle number of the second nozzle 1141 is set to ni+1, a nozzle number of the third nozzle 1141 is set to ni+2, and a nozzle number of the nth nozzle 1141 is set to ni+(n−1), and the nozzles 1141 whose (n−1) number is 0 or an even number are regarded as the even-numbered nozzles 1141, and the nozzles 1141 whose (n−1) number is odd are regarded as the odd-numbered nozzles 1141, as will be explained below.

There is one type of the main delay time (i.e., the first delay time). For the main delay time, for example, the main delay time for the odd-numbered nozzles 1141 is set with respect to the even-numbered nozzles 1141. The main delay time is set in a periodic triangular wave shape with two nozzles with respect to an arrangement direction of the nozzles 1141. In the main delay time, a pressure propagation time (AL) is set such that the odd-numbered nozzles are in reverse phase with respect to the even-numbered nozzles. The pressure propagation time is a time during which a pressure wave propagates from a rear end to a tip end of the pressure chamber 1131. With the main delay time, a decrease in print quality due to fluid crosstalk between the adjacent nozzles 1141 can be prevented. For example, the main delay time is generated by a first delay time generation circuit 1351 of the delay time generation circuit 135 to which the individual electrodes 118 of the pressure chambers 1131 corresponding to the odd-numbered nozzles 1141 are connected. For example, an optimal value of the first delay time is a time at which ejection speeds of the odd-numbered nozzles 1141 and the even-numbered nozzles 1141 are the same when they are simultaneously driven, and in the present embodiment, as illustrated in FIGS. 5 and 7, an optimal time difference is 2.0 μs. Here, the plurality of grouped nozzles 1141 are arranged in alternating odd and even numbers, and thus when the time difference (i.e., the main delay time) between the adjacent nozzles 1141 is 2.0 μs, a variation in ejection speed due to structural or fluidic crosstalk between the nozzles 1141 can be minimized.

The sub delay time (i.e., the second delay time) is set in a periodic triangular wave shape with respect to the arrangement direction of the nozzles 1141. For example, as illustrated in FIG. 5, the sub delay time is set in a periodic triangular wave shape with three or more nozzles with respect to nozzle numbers adjacent to each other. The triangular wave shape means that, for a minimum value and a maximum value of the sub delay time in one period, the sub delay time monotonically increases from the minimum value through an intermediate value to the maximum value, and monotonically decreases from the maximum value through the intermediate value to the minimum value, the intermediate value is smaller than a difference between the maximum value and the minimum value, and the minimum value, the maximum value, and the intermediate value between the minimum value and the maximum value are the same value for two consecutive values. As illustrated in FIGS. 5 and 7, the minimum value of the sub delay time is set for two adjacent nozzles 1141, and similarly, the maximum value is set for two adjacent nozzles 1141. Even in the sub delay time between the maximum value and the minimum value, for example, the same sub delay amount is set for two adjacent nozzles 1141. For example, the sub delay time is generated by each second delay time generation circuit 1352 of the delay time generation circuit 135 to which the individual electrodes 118 of the pressure chambers 1131 corresponding to the respective nozzles 1141 are connected.

For example, the sub delay time is set to a period of every eight nozzles 1141 as illustrated in FIGS. 5 and 7, and the sub delay time is set to, for example, four types of delay timing. The delay timings for the eight nozzles 1141 are distributed from two types of delay timings of the main delay time to eight types of delay timings by these sub delay times. In this way, by reducing the number of pressure chambers 1131 corresponding to the plurality of nozzles 1141 that are driven simultaneously, an instantaneous current can be reduced and a voltage drop can be reduced, thereby preventing a deterioration in print quality.

As illustrated in FIG. 5, such a sub delay time can be set by setting four types of delay timing in a triangular wave shape with respect to the arrangement direction of the nozzles 1141 such that a difference in delay time between the adjacent nozzles 1141 is small. That is, the sub delay time can be set in a triangular wave shape to prevent the four types of delay timing from being partially discontinuous with respect to the arrangement direction of the nozzles 1141, forming a sawtooth wave shape, and causing density unevenness.

For example, the sub delay time is a delay time that is 0.1 times or less the pressure propagation time (AL). For example, as illustrated in FIG. 7, when the period is 8 nozzles and a time difference between the sub delay times is 0.1 μs, the minimum value of the delay time in each nozzle 1141 is 0 μs and the maximum value thereof is 0.3 μs. For example, the sub delay time (i.e., the second delay time) for nozzle numbers 1, 9, . . . , and 1+8n is 2 μs, the sub delay time for nozzle numbers 2, 10, . . . , and 2+8n is 0 μs, the sub delay time for nozzle numbers 3, 11, . . . , and 3+8n is 0 μs, the sub delay time for nozzle numbers 4, 12, . . . , and 4+8n is 0.1 μs, the sub delay time for nozzle numbers 5, 13, . . . , and 5+8n is 0.1 μs, the sub delay time for nozzle numbers 6, 14, . . . , and 6+8n is 0.3 μs, the sub delay time for nozzle numbers 7, 15, . . . , and 7+8n is 0.3 μs, and the sub delay time for nozzle numbers 8, 16, . . . , and 8+8n is 0.2 μs. In this way, the respective sub delay times from the minimum sub delay time to the maximum sub delay time are set to the same time in the two adjacent nozzles 1141, and sub delay times other than the minimum value and the maximum value are set with time differences between the set sub delay times from the minimum value to the maximum value and from the maximum value to the minimum value. Here, although 0.1 times or less includes 0 μs numerically, due to reasons of the configuration of the drive circuit, a sub delay time is used to avoid current concentration and electrical crosstalk during simultaneous driving, so that 0 is not included, and a lower limit is a time when a charge or discharge waveform of the current drops sufficiently. Therefore, an example of the lower limit value may be 0.05 μs or 0.05 times AL, but for convenience of explanation, the lower limit value of the sub delay time will be explained as 0 μs.

The delay time for each nozzle 1141 as the drive timing is set for each group based on the sum of the main delay time and the sub delay time, and thus the delay time is distributed to eight types of timing of 0 μs, 0.1 μs, 0.2 μs, 0.3 μs, 2.0 μs, 2.1 μs, 2.2 μs, and 2.3 μs, as illustrated in FIG. 6. The delay times are 2.2 μs, 0.2 μs, 2.0 μs, 0.1 μs, 2.1 μs, 0.3 μs, 2.3 μs, and 0.2 μs in the order of the nozzle numbers 1 to 8, and the current concentration at the time of simultaneous driving can be effectively reduced. As illustrated in FIG. 7, the time difference between the adjacent nozzles 1141 is in a range of 1.8 μs to 2.2 μs, the sub delay time for the adjacent nozzles 1141 is −0.2 μs to 0.2 μs while the main delay time for the adjacent nozzles 1141 is 2 μs, and thus the effect of reducing crosstalk can be maintained.

That is, the drive timing of the adjacent nozzles 1141 is set within a range of ±0.2 μs with respect to the main delay time (i.e., 2.0 μs), which is an optimal time difference between the even-numbered and odd-numbered nozzles 1141 illustrated in FIG. 7, thereby reducing a variation in ejection speed due to crosstalk. Since there is no significant change in time difference between the adjacent nozzles 1141, the occurrence of density unevenness between the adjacent nozzles 1141 can be prevented.

In this way, when receiving the print trigger signal, the drive IC 132 including the drive circuit generates drive waveforms with different drive timings or delay times as illustrated in FIG. 6 for each of the predetermined grouped nozzles 1141, based on a triangular wave-shaped main delay time based on the optimal time difference between the even-numbered and odd-numbered nozzles 1141 illustrated in FIGS. 5 and 7 and a triangular wave-shaped sub delay time illustrated in FIGS. 5 and 7. The drive IC 132 generates the drive waveforms for the individual electrodes 118 corresponding to the respective nozzle 1141 with different drive timings, and applies the drive waveforms to the individual electrodes 118 of the corresponding pressure chambers 1131. That is, the drive IC 132 changes the volumes of the corresponding pressure chambers 1131 by deforming the piezoelectric bodies 1134 of the corresponding pressure chambers 1131 at different drive timings, thereby ejecting ink.

The printed wiring board 133 is a printing wiring assembly (PWA) on which various electronic components or connectors are mounted.

In the liquid ejection head 1 configured in this manner, after receiving the print trigger signal, the drive IC 132 generates drive waveforms based on print data for each of the predetermined grouped nozzles 1141 with different drive timings or delay times as illustrated in FIG. 6, based on the triangular wave-shaped main delay time based on the optimum time difference between the even-numbered and odd-numbered nozzles 1141 and the triangular wave-shaped sub delay time as illustrated in FIGS. 5 and 7. The drive IC 132 applies the drive waveforms to the individual electrodes 118 corresponding to the respective nozzles 1141 at different drive timings. In this way, the drive circuit of the drive IC 132 controls drive of the pressure chambers 1131 of the actuator 113 at different drive timings as a control method.

That is, the drive IC 132 changes the volumes of the corresponding pressure chambers 1131 by deforming the piezoelectric bodies 1134 of the corresponding pressure chambers 1131 at different drive timings, thereby ejecting ink. Then, in the liquid ejection head 1, by setting the main delay time between the adjacent nozzles 1141 to be the optimum time difference, a variation in ejection speed between the nozzles 1141 due to structural or fluidic crosstalk can be minimized. In the liquid ejection head 1, the sub delay time is set in a triangular wave shape with a constant period for adjacent nozzle numbers, and thus for the delay time or the drive timing for the adjacent nozzles 1141, the drive timing is set in a range of ±0.2 μs with respect to the main delay time (i.e., 2.0 μs), so that the variation in ejection speed due to crosstalk can be reduced. Since there is no significant change in time difference between the adjacent nozzles 1141, the occurrence of density unevenness between the adjacent nozzles 1141 can be prevented. That is, as in the related art illustrated in FIG. 8, if there are portions (see ranges de in FIG. 8) where the delay time is discontinuous with respect to the arrangement direction of nozzles, i.e., with respect to the arrangement direction of the nozzles 1141, and a sawtooth wave shape is formed, a large change occurs in time difference between the adjacent nozzles, resulting in uneven density between the adjacent nozzles. However, since the delay time with respect to the arrangement direction of the nozzles 1141 of the liquid ejection head 1 having a one-dimensional nozzle arrangement is configured to be in a triangular wave shape as illustrated in FIG. 6, as compared with the delay time that is discontinuous or sawtooth wave-shaped with respect to the arrangement direction of nozzles in the related art illustrated in FIG. 8, the liquid ejection head 1 can prevent the occurrence of density unevenness.

According to the liquid ejection head 1 described above, the pressure chambers 1131 or the piezoelectric bodies 1134 are driven and controlled at different drive timings for each group of the grouped nozzles 1141 with the main delay time set to the optimum time difference and the sub delay time set to be in a triangular wave shape. Accordingly, the liquid ejection head 1 can prevent the occurrence of density unevenness by reducing the difference in delay time between the adjacent nozzles 1141.

Hereinafter, the liquid ejection apparatus 2 including the liquid ejection head 1 will be described with reference to FIG. 9. The liquid ejection apparatus 2 is an inkjet recording apparatus that ejects ink. The liquid ejection apparatus 2 includes a housing 2111, a medium supply unit 2112, an image forming unit 2113, a medium discharge unit 2114, a conveyance device 2115 which is a support device, the temperature control device 2116, a maintenance device 2117, and a control unit 2118. The liquid ejection apparatus 2 includes a temperature control device that adjusts a temperature of ink supplied to the liquid ejection head 1.

The liquid ejection apparatus 2 is an inkjet printer that performs image formation on paper P by ejecting liquid such as ink while conveying, for example, the paper P as a recording medium, which is an ejection object, along a specified conveying path 2001 from the medium supply unit 2112 through the image forming unit 2113 to the medium discharge unit 2114.

The medium supply unit 2112 includes a plurality of paper supply cassettes 21121. The image forming unit 2113 includes a support portion 2120 that supports paper, and a plurality of head units 2130 disposed above and facing the support portion 2120. The medium discharge unit 2114 includes a paper discharge tray 21141.

The support portion 2120 includes a conveying belt 21201 provided in a loop shape in a predetermined area where image formation is performed, a support plate 21202 that supports the conveying belt 21201 from a back side, and a plurality of belt rollers 21203 provided on the back side of the conveying belt 21201.

The head unit 2130 includes a plurality of liquid ejection heads 1 as inkjet heads, a plurality of supply tanks 2132 as liquid tanks mounted on the respective liquid ejection heads 1, a pump 2134 that supplies ink, and a connection flow path 2135 that connects the liquid ejection heads 1 and the supply tanks 2132.

In the present example, the head unit 2130 includes, as the liquid ejection heads 1, the liquid ejection heads 1 of four colors of cyan, magenta, yellow, and black, and the supply tanks 2132 of four colors for storing inks of the respective colors. The supply tanks 2132 are connected to the liquid ejection heads 1 by the connection flow path 2135.

The pump 2134 is, for example, a liquid sending pump formed of a piezoelectric pump. The pump 2134 is connected to the control unit 2118 and is driven and controlled by the control unit 2118.

The connection flow path 2135 includes a supply flow path connected to an ink supply pipe of the liquid ejection head 1. The connection flow path 2135 includes a collection flow path connected to an ink discharge pipe of the liquid ejection head 1. For example, if the liquid ejection head 1 is of a non-circulation type, the collection flow path is connected to the maintenance device 2117. If the liquid ejection head 1 is of a circulation type, the collection flow path is connected to the supply tank 2132.

The conveyance device 2115 conveys the paper P along the conveying path 2001 from the paper supply cassette 21121 of the medium supply unit 2112 through the image forming unit 2113 to the paper discharge tray 21141 of the medium discharge unit 2114. The conveyance device 2115 includes a plurality of guide plate pairs 21211 to 21218 disposed along the conveying path 2001 and a plurality of conveyance rollers 21221 to 21228. The conveyance device 2115 supports the paper P so as to be movable relative to the liquid ejection head 1.

The temperature control device 2116 includes a temperature control water tank 21161, a temperature control circuit 21162 such as a pipe and a tube for supplying temperature control water, a pump for supplying temperature control water, a temperature regulator for adjusting a temperature of temperature control water, and the like. The temperature control device 2116 supplies temperature control water in the temperature control water tank 21161 that is adjusted to a predetermined temperature by the temperature regulator to a temperature control water supply pipe of the liquid ejection head 1 via the temperature control circuit 21162 by water supply of the pump. The temperature control device 2116 collects water discharged from a temperature control water discharge pipe through the manifold unit 12 in the temperature control water tank 21161 via the temperature control circuit 21162. The temperature regulator is, for example, a heater or a cooler. The temperature control device 2116 may adjust a temperature of ink supplied to the liquid ejection head 1.

The maintenance device 2117 sucks and collects ink remaining on the outer surface of the nozzle plate 114 during maintenance, for example. If the liquid ejection head 1 is of a non-circulation type, the maintenance device 2117 collects ink in the head main body 11 during maintenance. Such a maintenance device 2117 includes a tray or tank for storing the collected ink.

The control unit 2118 is a control circuit that includes a processor such as a CPU 21181, one or more memories such as a read only memory (ROM) that stores various programs and a random access memory (RAM) that temporarily stores various types of variable data, image data, and the like, and a network interface circuit that receives data from the outside and outputs data to the outside.

According to the liquid ejection apparatus 2 described above, the pressure chambers 1131 are driven and controlled at different drive timings for each group of the grouped nozzles 1141 with the main delay time set to the optimum time difference and the sub delay time set to be in a triangular wave shape. Accordingly, the liquid ejection head 1 can prevent a large change in drive timing between the adjacent nozzles 1141, and can prevent an occurrence of density unevenness.

Embodiments of the present disclosure are not limited to the above-described configuration. For example, in the above example, the liquid ejection head 1 is described as being provided with a pair of head main bodies 11, but the present disclosure is not limited thereto, and the liquid ejection head 1 may be configured to have one head main body 11. Although the above-described liquid ejection head 1 has been described as an example in which the actuator 113 is of a share-mode type, the present disclosure is not limited thereto, and the actuator may be of a stacking type.

According to the liquid ejection head 1 described above, the pressure chambers 1131 or the piezoelectric bodies 1134 are driven and controlled at different drive timings for each group of the grouped nozzles 1141 with the main delay time set to the optimum time difference and the sub delay time set to be in a triangular wave shape. Accordingly, the liquid ejection head 1 can prevent the occurrence of density unevenness by reducing the difference in delay time between the adjacent nozzles 1141.

While certain embodiments have been described, these embodiments have been presented by way of examples only, and are not intended to limit the scope of the disclosure. These novel embodiments can be implemented in various other forms, and various omissions, substitutions, and modifications can be made without departing from the gist of the disclosure. The embodiments and the modifications thereof are included in the scope and the gist of the disclosure, and are included in the scope of the disclosure disclosed in the claims and equivalents thereof.

What is claimed is:

1. A liquid ejection head comprising:

a nozzle plate having a plurality of nozzles arranged in a first direction;

a plurality of pressure chambers that respectively communicate with the nozzles, a volume of each of the pressure chambers being varied to eject liquid through the corresponding nozzle;

an actuator configured to vary the volumes of the pressure chambers independently according to drive waveforms respectively applied to the pressure chambers; and a drive circuit configured to generate a drive waveform for each of the pressure chambers with a delay time to cause the liquid to be ejected through the corresponding nozzle with the delay time, wherein the drive circuit is configured to determine the delay time for a drive waveform for a particular pressure chamber to be a sum of:

a first delay time for the particular pressure chamber, wherein the first delay time for all the pressure chambers varies so as to have a triangular wave shape with respect to positions of the pressure chambers in the first direction, and a second delay time for the particular pressure chamber, wherein the second delay time for all the pressure chambers varies so as to have a periodic wave shape with respect to the positions of the pressure chambers in the first direction, a periodicity of the wave shape of the second delay time being different from a periodicity of the wave shape of the first delay time.

2. The liquid ejection head according to claim 1, wherein the drive circuit determines the first delay time based on a pressure propagation time of the liquid in the pressure chambers.

3. The liquid ejection head according to claim 1, wherein the drive circuit determines the first delay time to be periodic for two pressure chambers.

4. The liquid ejection head according to claim 3, wherein a period of the wave shape of the second delay time is longer than a period of the wave shape of the first delay time.

5. The liquid ejection head according to claim 1, wherein the drive circuit determines the second delay time to be 0.1 times or less a pressure propagation time of the liquid in the pressure chambers.

6. The liquid ejection head according to claim 5, wherein a period of the wave shape of the second delay time is longer than a period of the wave shape of the first delay time.

7. The liquid ejection head according to claim 1, wherein the drive circuit determines the second delay time to be periodic for three or more pressure chambers.

8. The liquid ejection head according to claim 1, wherein the first delay time is either a first value or a second value that is greater than the first value.

9. The liquid ejection head according to claim 8, wherein the first value is zero.

10. The liquid ejection head according to claim 9, wherein the second delay time includes the first value and a third value that is greater than the first value and less than the second value.

11. A liquid ejection apparatus for ejecting a liquid onto a medium, the liquid ejection apparatus comprising:

a conveyer for conveying the medium; and a liquid ejection head configured to eject the liquid onto the conveyed medium, wherein the liquid ejection head includes:

a nozzle plate having a plurality of nozzles arranged in a first direction, a plurality of pressure chambers that respectively communicate with the nozzles, a volume of each of the pressure chambers being varied to eject the liquid through the corresponding nozzle, an actuator configured to vary the volumes of the pressure chambers independently according to drive waveforms respectively applied to the pressure chambers, and a drive circuit configured to generate a drive waveform for each of the pressure chambers with a delay time to cause the liquid to be ejected through the corresponding nozzle with the delay time, and the drive circuit is configured to determine the delay time for a drive waveform for a particular pressure chamber to be a sum of:

a first delay time for the particular pressure chamber, wherein the first delay time for all the pressure chambers varies so as to have a triangular wave shape with respect to positions of the pressure chambers in the first direction, and a second delay time for the particular pressure chamber, wherein the second delay time for all the pressure chambers varies so as to have a periodic wave shape with respect to the positions of the pressure chambers in the first direction, a periodicity of the wave shape of the second delay time being different from a periodicity of the wave shape of the first delay time.

12. The liquid ejection apparatus according to claim 11, wherein the drive circuit determines the first delay time based on a pressure propagation time of the liquid in the pressure chambers.

13. The liquid ejection apparatus according to claim 11, wherein the drive circuit determines the first delay time to be periodic for two pressure chambers.

14. The liquid ejection apparatus according to claim 13, wherein a period of the wave shape of the second delay time is longer than a period of the wave shape of the first delay time.

15. The liquid ejection apparatus according to claim 11, wherein the drive circuit determines the second delay time to be 0.1 times or less a pressure propagation time of the liquid in the pressure chambers.

16. The liquid ejection apparatus according to claim 15, wherein a period of the wave shape of the second delay time is longer than a period of the wave shape of the first delay time.

17. The liquid ejection apparatus according to claim 11, wherein the drive circuit determines the second delay time to be periodic for three or more pressure chambers.

18. The liquid ejection apparatus according to claim 11, wherein the first delay time is either a first value or a second value that is greater than the first value.

19. The liquid ejection apparatus according to claim 18, wherein the first value is zero, and the second delay time includes the first value and a third value that is greater than the first value and less than the second value.

20. The liquid ejection apparatus according to claim 11, wherein the liquid ejection apparatus includes a printer, and the liquid includes ink.

* * * * *